United States Patent
Lynch

(10) Patent No.: US 10,115,502 B1
(45) Date of Patent: Oct. 30, 2018

(54) INSULATOR AND CONDUCTOR COVER FOR ELECTRICAL DISTRIBUTION SYSTEMS

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 0 days.

(21) Appl. No.: 15/681,357

(22) Filed: Aug. 19, 2017

(51) Int. Cl.
*H01B 17/22* (2006.01)
*H02G 3/30* (2006.01)
*H01B 17/14* (2006.01)
*H02G 7/20* (2006.01)
*H01B 17/16* (2006.01)
*H01B 17/24* (2006.01)

(52) U.S. Cl.
CPC .......... *H01B 17/22* (2013.01); *H01B 17/145* (2013.01); *H02G 3/24* (2013.01); *H02G 7/205* (2013.01); *H01B 17/16* (2013.01); *H01B 17/24* (2013.01)

(58) Field of Classification Search
CPC ........ H01B 17/22; H01B 17/145; H02G 3/24; H02G 7/205
See application file for complete search history.

(56) References Cited

U.S. PATENT DOCUMENTS

| | | | | | |
|---|---|---|---|---|---|
| 4,178,470 | A | * | 12/1979 | Jean .................. | H01B 17/22 174/156 |
| 4,396,794 | A | * | 8/1983 | Stiller ................ | H01B 17/22 174/144 |
| 4,398,057 | A | * | 8/1983 | Shankle ............. | H01B 17/22 174/2 |
| 4,741,097 | A | * | 5/1988 | D'Agati ............. | H01B 17/22 174/173 |

* cited by examiner

*Primary Examiner* — Dhirubhai R Patel
(74) *Attorney, Agent, or Firm* — Patent Law Group LLP; Brian D. Ogonowsky

(57) ABSTRACT

A dielectric cover for an insulator and conductor in an electrical distribution includes an insulator cover portion for covering the insulator. A knob and ridge extend down from an inside ceiling of the insulator cover portion. An arm, for covering a portion of the conductor extending from the insulator, has a top keyhole, where the keyhole has a wide portion that fits over the knob in a first position and a narrow portion that restricts vertical movement of the arm in a locked position when the arm is withdrawn slightly. The arm also has a resilient tab that snaps over the ridge in the locked position, wherein the knob in combination with the keyhole restrict further withdrawing of the arm from the insulator cover portion in the locked position, and the tab contacting the ridge restricts further insertion of the arm into the insulator cover portion in the locked position.

18 Claims, 5 Drawing Sheets

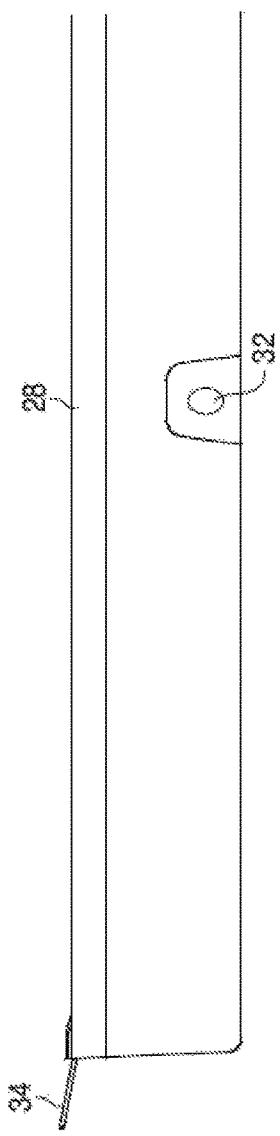
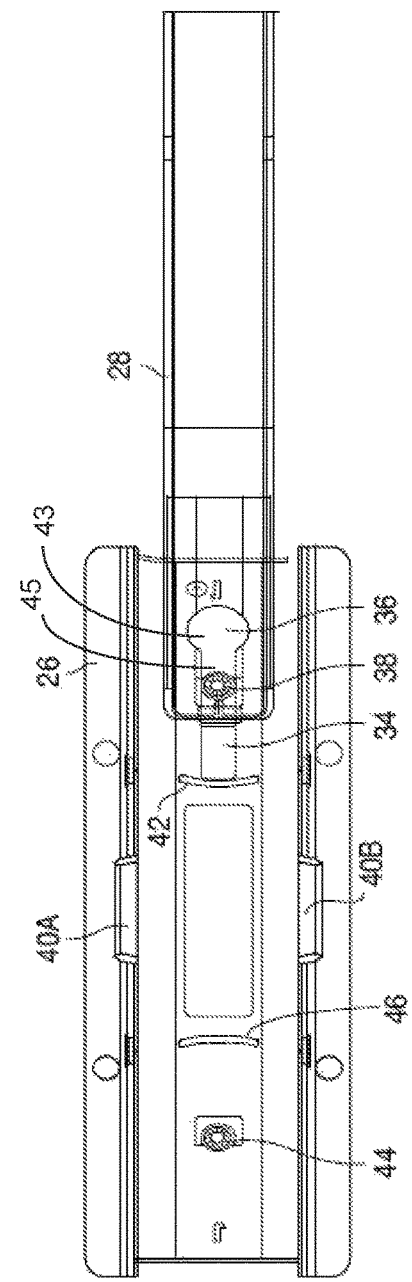
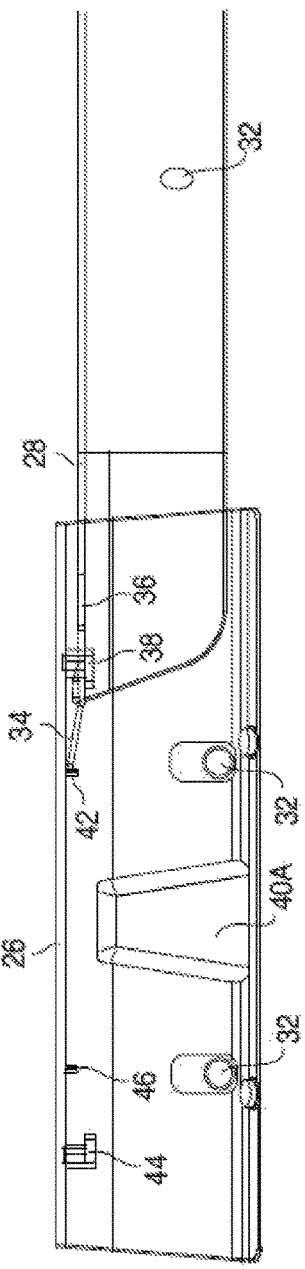
FIG. 3
FIG. 4
FIG. 5

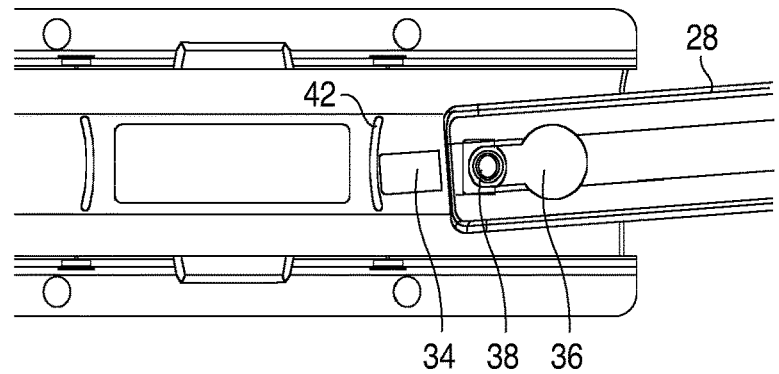
FIG. 9
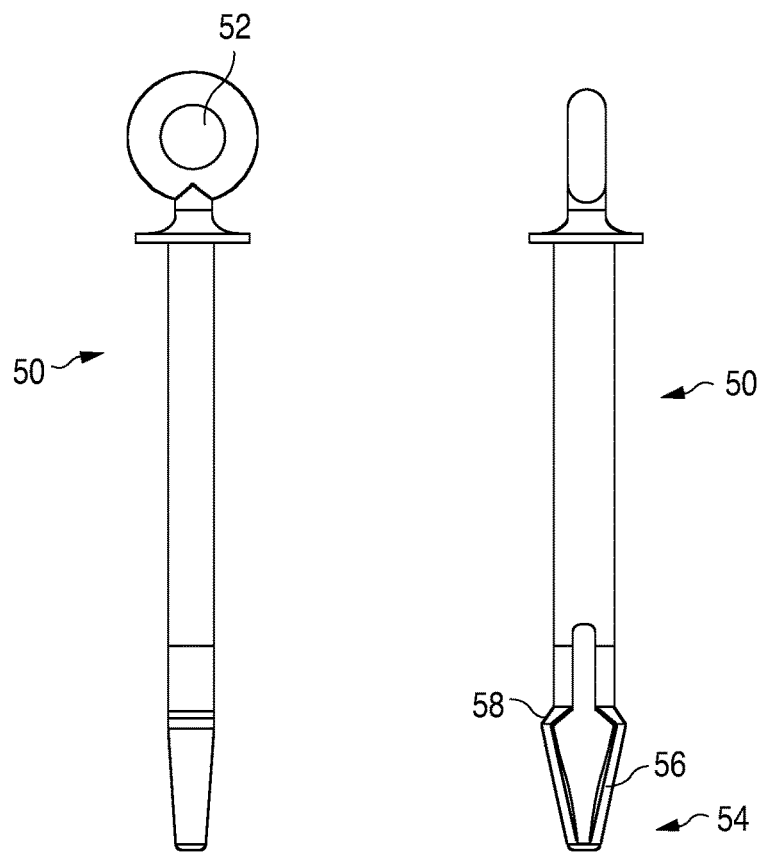
FIG. 10A  FIG. 10B

INSULATOR AND CONDUCTOR COVER FOR ELECTRICAL DISTRIBUTION SYSTEMS

FIELD OF THE INVENTION

This invention relates to a dielectric cover for high voltage power line insulators and conductors (wires) and, in particular, to an insulator cover system that has an attachable, pivotable arm for covering the conductor.

BACKGROUND

A wood or metal utility pole is typically used for supporting high voltage (HV) conductors (e.g., twisted wire strands) in a power distribution system. Each pole has secured to it one or more horizontal crossarms that support insulators which, in turn, support the HV conductors. The insulators are typically ceramic or a polymer. A conductor is typically secured over the top of each insulator, or along its side, via a metal tie wire, a bracket, or other means.

FIG. 1 is a perspective view of a top portion of a crossarm 10 of a utility pole. An insulator 12 is affixed to the crossarm 10 with a bolt 14. A conductor 16 seats in a top groove in the insulator 12 or along the neck area 18. There are many different designs of such insulators, and FIG. 1 shows a conventional design. A common feature of such insulators is a narrow neck area 18 and a wider skirt 20.

One known problem with exposed insulators and conductors is that large birds or other wildlife may alight on the crossarm and short out phases or short a conductor to ground. Insulating (e.g., plastic) covers that cover the insulator 12 and a portion of the conductor 16 extending from the insulator are known. Such covers are large and unwieldy when handled by a lineman due to the required length of the arms for covering the conductors. The cover may be required to be completely installed using a hotstick.

It would be desirable to provide such a cover in multiple pieces to simplify the handling and storage of the cover. Once assembled, the cover should be very robust. Therefore, what is needed is a dielectric cover for an insulator supporting a HV conductor, where the arms for covering the conductor are easily and reliably connectable to the insulator cover, and the assembled cover is easily secured in place, such as by using a hotstick.

SUMMARY

A dielectric cover for a conventional insulator supporting a HV conductor is disclosed where an insulator cover portion and a conductor cover portion (arms) are easily and reliably attachable to each other in the field, and the assembled cover is easily secured in place over the insulator and conductor. The attachment mechanism also allows the arms to pivot vertically and horizontally to adapt to conductors that may bend around the insulator and not be horizontal.

The attachment of the arms to the insulator cover portion will typically be performed by the lineman in the field prior to the insulator cover portion being secured over the insulator. No tools are required. Each arm includes a keyhole that engages a downward facing knob (or boss) extending from the inside of the insulator cover portion. The insulator cover also has a raised ridge near the knob.

The arm has a resilient tab that rides over the raised ridge as the arm's keyhole engages the knob on the cover. As the arm is then pulled back to lock the knob in the narrow portion of the keyhole, the arm's resilient tab passes over the raised ridge and then snaps against the top wall of the cover. Now, the arm is secured in one direction by the keyhole engaging the knob and secured in the other direction by the resilient tab abutting the sidewall of the ridge. The arms can pivot around the knob vertically and horizontally.

The entire cover is then secured in place by pins that pass through holes in the insulator cover portion and arms and under the conductor. The cover and pins can be manipulated by a hotstick, so it is not required to power down the conductor when installing the cover.

Other features of the cover system are also described.

BRIEF DESCRIPTION OF THE DRAWINGS

FIG. 3 is a side view of the attachable arm portion of the cover showing a resilient tab for locking the arm in place.

FIG. 4 is a partially transparent bottom up view of the insulator cover portion and arm after being connected together, where the keyhole in the arm is shown engaging a knob on the insulator cover portion.

FIG. 5 is a partially transparent side view of the insulator cover portion with the arm attached.

FIG. 9 is a bottom up view of the arm locked into place on the insulator cover portion showing how the arm is pivotable to adapt to a conductor that bends around the insulator.

FIG. 10A illustrates a pin that is inserted through holes in the cover for securing the cover in place with respect to the insulator and conductor.

FIG. 10B is a side view of the pin of FIG. 10A.

Elements labeled with the same numerals in the various figures may be identical or similar.

DETAILED DESCRIPTION

Figure 1:
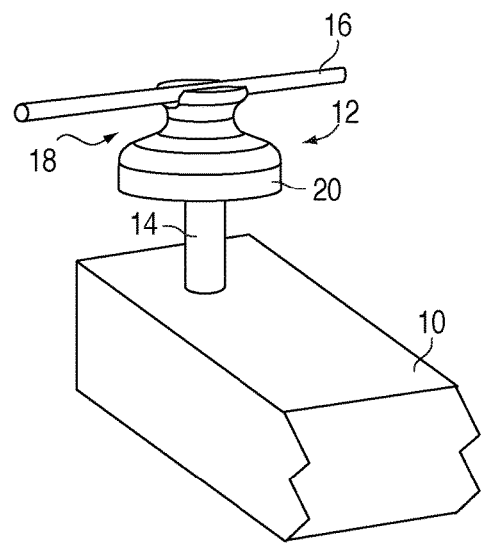
FIG. 1 is a perspective view of a crossarm of a utility pole supporting a conventional insulator and HV conductor.
Figure 2:
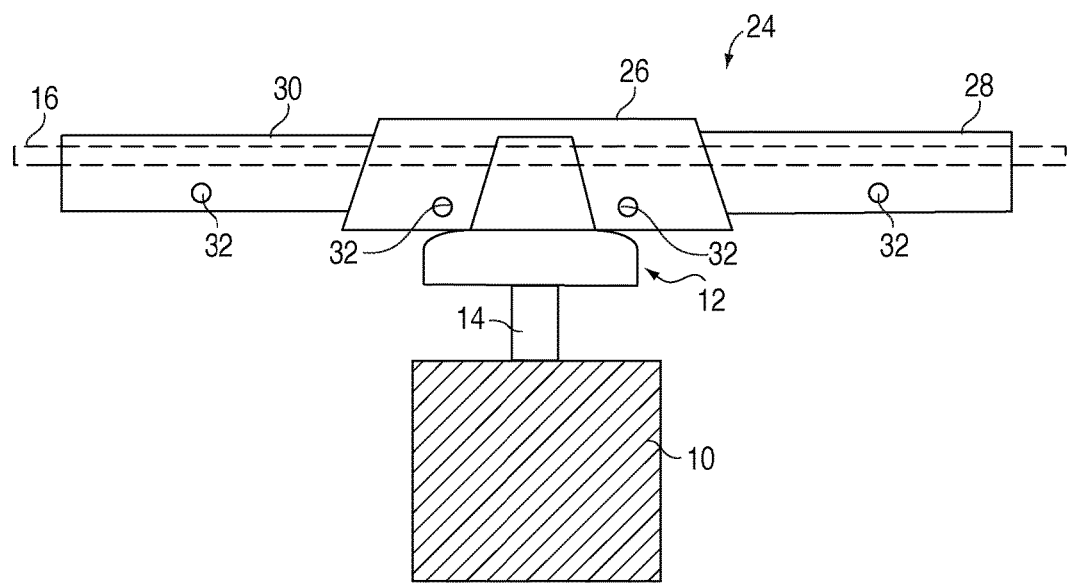
FIG. 2 is a side view of a dielectric cover, in accordance with the present invention, covering the insulator of FIG. 1 and a portion of the conductor for preventing outages from wildlife.

FIG. 2 is a side view of a dielectric cover 24, such as a molded plastic, in accordance with the present invention, covering the insulator 12 of FIG. 1 and a portion of the conductor 16 for preventing outages from wildlife or protecting the wildlife. The cover 24 comprises an insulator cover portion 26 and two identical attachable arms 28 and 30. Holes 32 extend through the cover 24 and are below the conductor 16. Pins, described later, are inserted through the holes 32 and under the conductor 16, which secures the cover 24 in place. The pins and the cover 24 may be manipulated by a hotstick while high voltage is conducted by the conductor 16 so there is no loss of power to the consumer when the cover 24 is installed.

The bottom of the insulator cover portion 26 rests on the wide skirt 20 of the insulator, or the top of the insulator abuts against the ceiling of the insulator cover portion 26, depending on the type of insulator used.

FIG. 3 is a side view of the attachable arm 28 of the cover 24 showing a resilient plastic tab 34 for locking the arm 28 in place.

FIG. 4 is a partially transparent bottom up view of the insulator cover portion 26 and arm 28, and FIG. 5 is a partially transparent side view of the insulator cover portion 26 and arm 28, after being connected together, where the keyhole 36 in the arm 28 is shown engaging a knob 38 extending down from the inside top of the insulator cover portion 26. The insulator cover portion 26 has expanded areas 40A and 40B for fitting around the narrow neck area 18 (FIG. 1) of the ceramic insulator 12. This helps prevent lateral sliding of the cover 24 along the insulator 12 and conductors 16.

The resilient tab 34 on the arm 28 rides over a downward facing ridge 42, molded in the top ceiling of the insulator cover portion 26, when the lineman initially positions the arm 28 so that the knob 38 is inserted through the wide opening 43 of the keyhole 36. The lineman then pulls the arm 28 in an outward direction so that the narrow portion 45 of the keyhole 36 closely slides around the knob 38. At the maximum outward position of the arm 28, the resilient tab 34 snaps over the ridge 42 to lock the arm 28 in place. The arm 28 is prevented from being pushed further into the insulator cover portion 26 by the abutting tab 34 and ridge 42, while the arm 28 is prevented from being pulled out of the insulator cover portion 26 by the keyhole 36 abutting the knob 38. The ridge 42 is shaped like an arc to allow the arm 28 to pivot around the knob 38 both vertically and horizontally. The knob 38 has a bottom expanded portion that blocks the downward movement of the narrow portion of the keyhole 36.

The other side of the insulator cover portion 26 is a mirror image with a second knob 44 and ridge 46.

Figure 6:
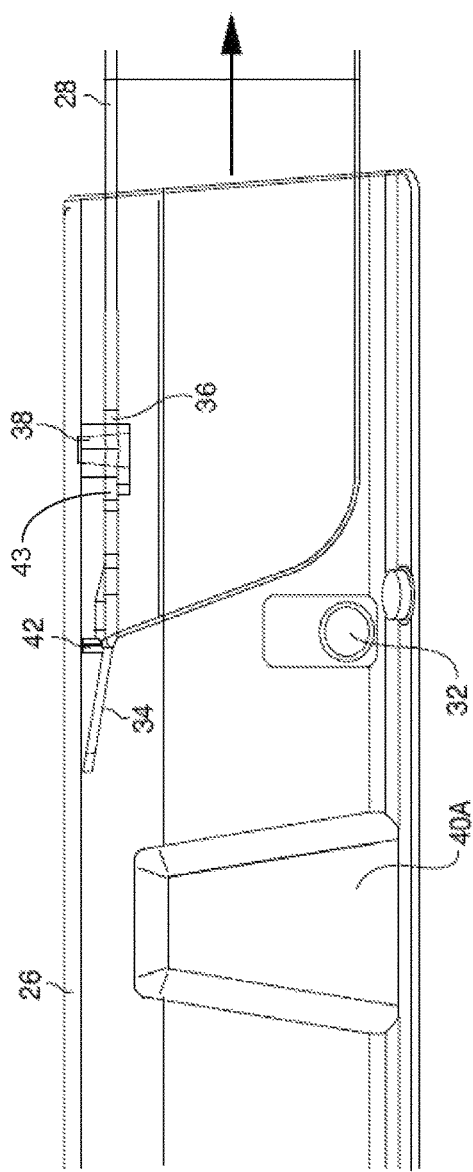
FIG. 6 is a partially transparent side view of the insulator cover portion with the knob inserted through the wide opening of the keyhole, where a resilient tab on the arm is resting over a ridge in the insulator cover portion.

FIG. 6 is a partially transparent side view of the insulator cover portion 26 with the knob 38 being inserted through the wide opening 43 of the keyhole 36, where the resilient tab 34 on the arm 28 is resting over the ridge 42 in the insulator cover portion 26 prior to the arm 28 being locked in place.

Figure 7:
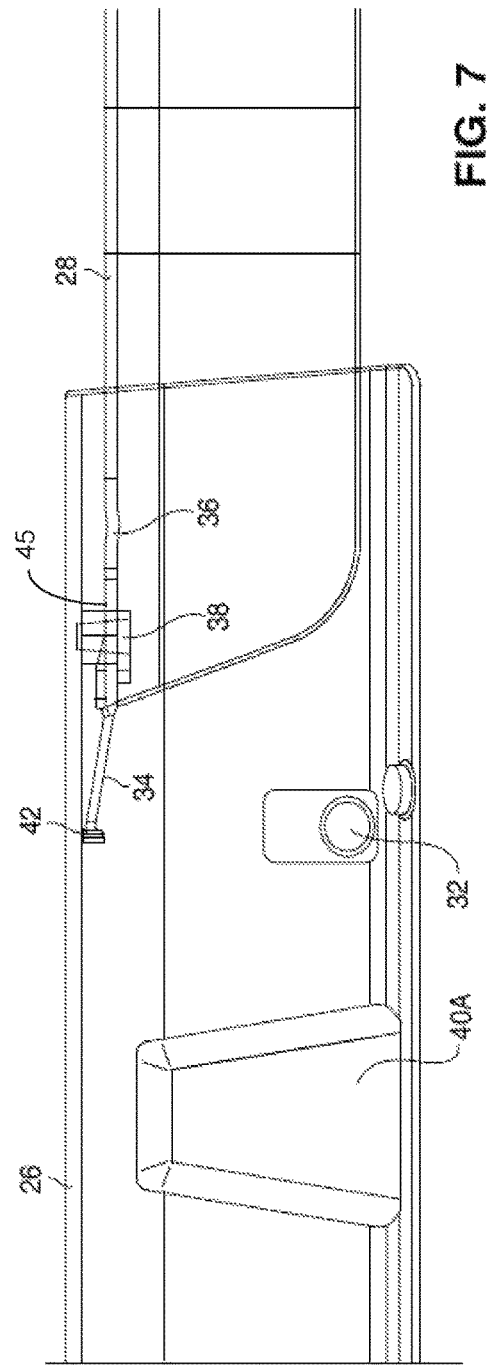
FIG. 7 is a partially transparent side view of the insulator cover portion with the arm of FIG. 6 pulled outward so that the knob on the insulator cover portion is now in the narrow portion of the keyhole and the resilient tab on the arm has come to rest against a sidewall of the ridge in the insulator cover portion, locking the arm in position.

FIG. 7 is a partially transparent side view of the insulator cover portion 26 with the arm 28 of FIG. 6 pulled outward so that the knob 38 is now in the narrow portion 45 of the keyhole 36 and the resilient tab 34 has snapped into place over the ridge 42 to lock the arm 28 in position. Such placement of the arm 28 and the locking of the arm 28 will typically be done by the lineman in the field. The attachment is performed without the need for any tools. Different length arms 28 may be provided for different wildlife protection requirements.

Figure 8:
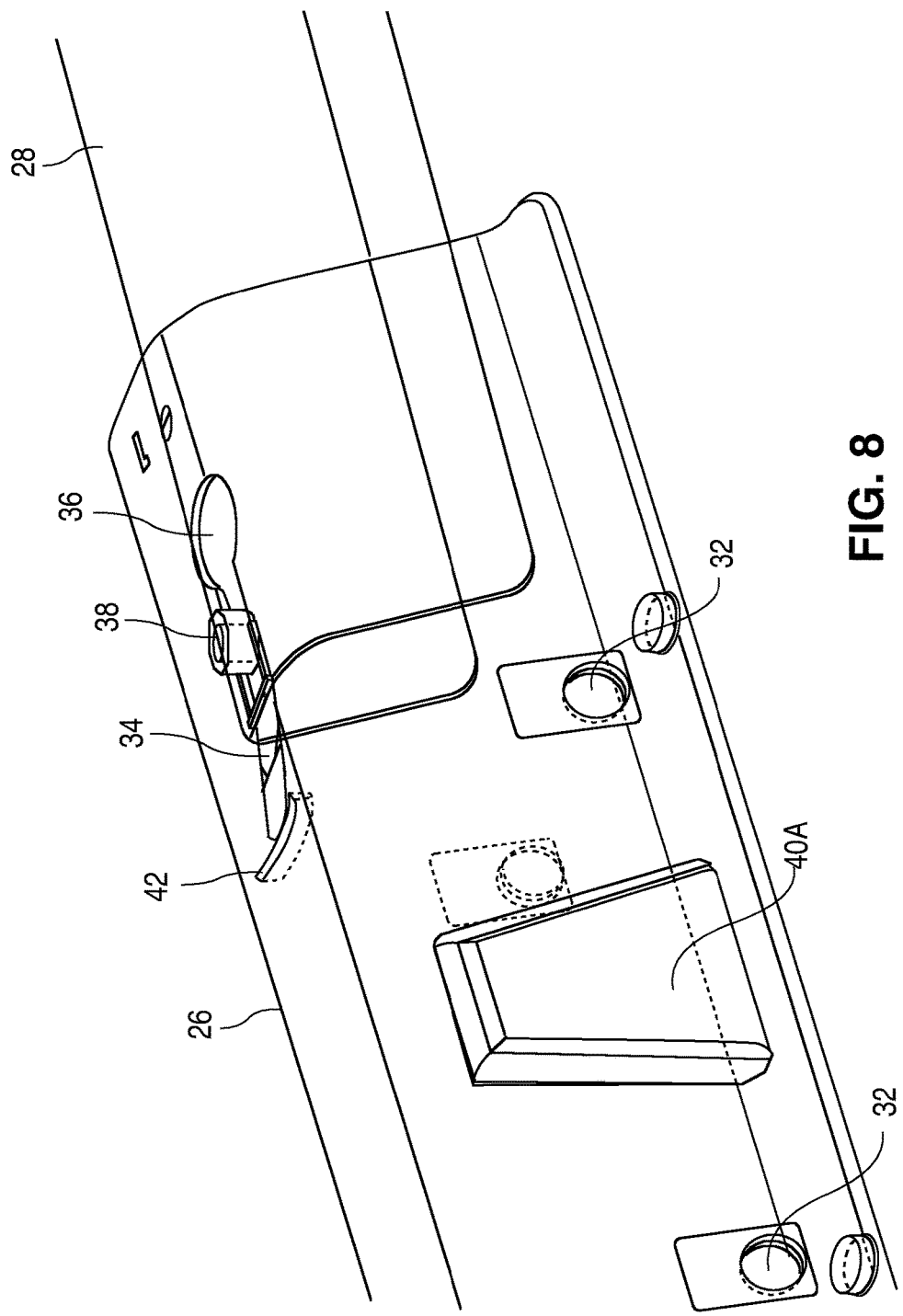
FIG. 8 is a partially transparent perspective view of the arm locked into place on the insulator cover portion.

FIG. 8 is a partially transparent perspective view of the arm 28 locked into place on the insulator cover portion 26.

FIG. 9 is a bottom up view of the arm 28 locked into place on the insulator cover portion 26 showing how the arm is pivotable to adapt to a conductor that bends around the insulator.

FIG. 10A illustrates a pin 50 that is inserted through the holes 32 in the insulator cover portion 26 and arms 28 and 30 for securing the cover 24 in place with respect to the insulator and conductor. FIG. 10B is a side view of the pin 50 of FIG. 10A. The pins 50 extend under the conductor 16 (see FIG. 2). The pins 50 through the insulator cover portion 26 also limit lateral shifting of the cover 24 with respect to the insulator 12.

The pins 50 may be inserted using a hotstick engaging the opening 52. A resilient tip 54 has a low angle taper portion 56 that allows easy insertion of the pins 50 through the holes 32 until the pins 50 lock into place. A much steeper angle portion 58 prevents the pins 50 from coming out under high winds. The pins 50 can be removed using a hotstick. The cover portion 26 may include a top hotstick loop for positioning the completed cover over the insulator and conductor using a hotstick.

The arms 28/30 may be removed by the lineman by reaching under the insulator conductor portion 26 and pulling down the tab 34, then pushing the arm 28/30 slightly into the insulator cover portion 26 to pass the knob 38 through the wide opening in the keyhole 36.

Ideally, the shapes of all components of the cover allow the components to be injection molded.

In another embodiment, the orientations of the knob, ridge, keyhole, and tab are reversed so that the arm is locked into position when pushed into the insulator cover portion after the knob is inserted through the wide opening in the keyhole. Accordingly, locking of the arm may be by sliding the arm in or out of the insulator cover portion, depending on which design is more desirable for the user.

The relative positions of the knob, ridge, keyhole, and tab may also be reversed, such that the tab/ridge prevent withdrawal of the arm from the insulator cover portion, and the keyhole/knob prevent further insertion of the arm into the insulator cover portion.

There are a variety of insulator shapes, and the insulator 12 of FIG. 1 is just an example. Other insulators are longer with sides having multiple ridges for higher voltages, and other insulators are simpler such as hemispherical with a connector, such as a vice, on top. The insulator cover portion and arms may be molded to accommodate any standard insulator shape while still retaining all aspects of the invention.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A dielectric cover for an insulator and conductor supported by the insulator, the conductor being for carrying a voltage, the insulator being supported by a support structure in an electrical distribution system, the cover comprising:

an insulator cover portion configured to cover at least a top portion of the insulator, the insulator cover portion comprising a knob and a ridge extending down from an inside ceiling of the insulator cover portion; and an arm configured to cover a portion of the conductor extending from the insulator, the arm having a keyhole formed in a ceiling of the arm, the keyhole having a wide portion that fits over the knob in a first position, wherein the keyhole has a narrow portion that restricts vertical movement of the arm in a locked position, the arm also having a resilient tab that snaps over the ridge in the locked position.

2. The cover of claim 1 wherein the knob in combination with the keyhole restrict withdrawing of the arm from the insulator cover portion in the locked position, and wherein the tab that has snapped over the ridge restricts insertion of the arm into the insulator cover portion in the locked position.

3. The cover of claim 1 wherein the knob in combination with the keyhole restrict insertion of the arm into the insulator cover portion in the locked position, and wherein the tab that has snapped over the ridge restricts withdrawal of the arm from the insulator cover portion in the locked position.

4. The cover of claim 1 wherein the interaction of the knob, keyhole, tab, and ridge in the locked position restricts axial movement of the arm relative to the insulator cover portion.

5. The cover of claim 1 wherein the arm is pivotable around the knob in the locked position.

6. The cover of claim 1 wherein the knob has an expanded bottom portion that prevents the narrow portion of the keyhole from being removed from the knob in a vertical direction while in the locked position.

7. The cover of claim 1 wherein the insulator cover portion and the arm have holes, the cover also comprising pins that insert through the holes under the conductor to restrict upward movement of the cover in the locked position.

8. The cover of claim 1 wherein a bottom width of the insulator cover portion allows the insulator cover portion to be placed over the top portion of the insulator, where a bottom of the cover rests on a skirt portion of the insulator.

9. The cover of claim 1 wherein the arm is a first arm that covers a first portion of the conductor extending away from the insulator in a first direction, the cover comprising a second arm identical to the first arm that covers a second portion of the conductor extending away from the insulator in a second direction, the second arm being attachable to the insulator cover portion via a second knob on the insulator cover portion, a second keyhole in the second arm, a second tab in the second arm, and a second ridge in the insulator cover portion.

10. The cover of claim 1 wherein the keyhole in the arm is slid along the knob until the tab snaps over the ridge to lock the arm in the locked position.

11. The cover of claim 1 wherein the insulator cover portion includes a center expanded portion for accommodating the top portion of the insulator.

12. The cover of claim 1 wherein the insulator includes a narrow neck area and a wider skirt, wherein the cover fits over the neck area but does not fit over the skirt.

13. A method of installing a cover over an insulator and conductor supported by the insulator, the conductor being for carrying a voltage, the insulator being supported by a support structure in an electrical distribution system, the method comprising:
    providing an insulator cover portion configured to cover the insulator, the insulator cover portion comprising a knob and a ridge extending down from an inside ceiling of the insulator cover portion;
    providing an arm configured to cover a portion of the conductor extending from the insulator, the arm having a keyhole formed in a ceiling of the arm, the keyhole having a wide portion and a narrow portion, the arm also having a resilient tab;
    inserting the knob through the wide portion of the keyhole;
    sliding the arm with respect to the insulator cover portion so that the knob engages the narrow portion of the keyhole in a locked position;
    causing the resilient tab in the arm to snap over the ridge in the locked position during sliding the arm; and
    securing the cover to the insulator and the conductor.

14. The method of claim 13 wherein the knob in combination with the keyhole restrict withdrawing of the arm from the insulator cover portion in the locked position, and wherein the tab that has snapped over the ridge restricts insertion of the arm into the insulator cover portion in the locked position.

15. The method of claim 13 wherein the knob in combination with the keyhole restrict insertion of the arm into the insulator cover portion in the locked position, and wherein the tab that has snapped over the ridge restricts withdrawal of the arm from the insulator cover portion in the locked position.

16. The method of claim 13 wherein sliding the arm comprises sliding the arm in a direction further into the insulator cover portion.

17. The method of claim 13 wherein sliding the arm comprises sliding the arm in a direction out of the insulator cover portion.

18. The method of claim 13 further comprising pushing pins through holes in the insulator cover portion and the arm so that the pins are beneath the conductor, to prevent the cover from being vertically lifted off the insulator and conductor.

* * * * *